Nov. 24, 1953
J. K. OSTRANDER
2,660,657
OFF-PEAK ELECTRIC WATER HEATING SYSTEM
Filed May 23, 1952
2 Sheets-Sheet 1
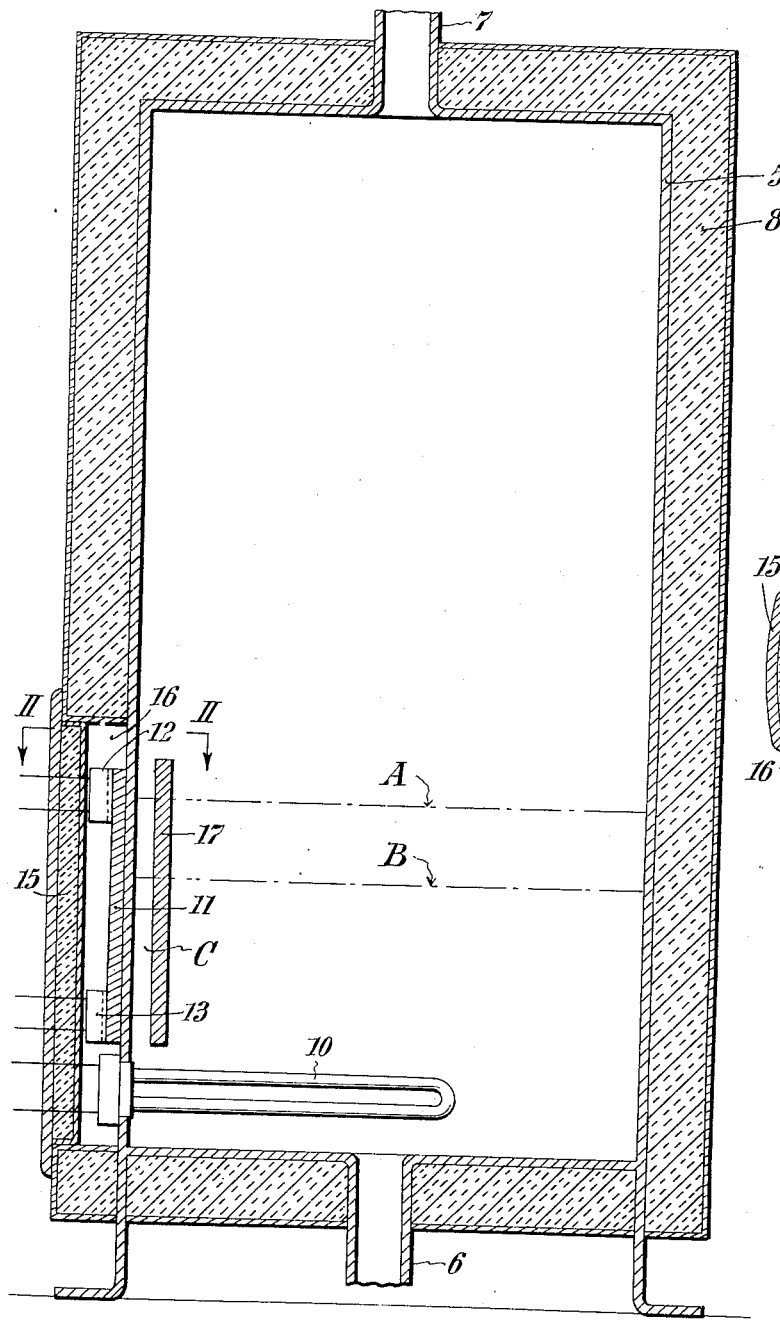
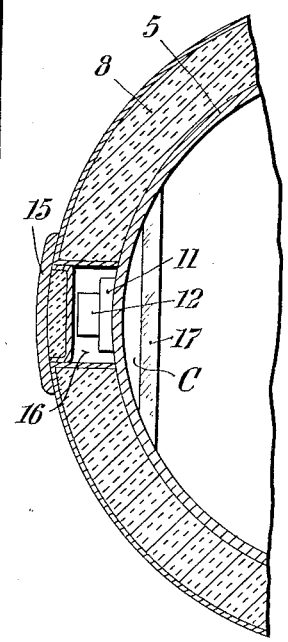
INVENTOR.
John K. Ostrander,
BY
Paul & Paul
ATTORNEYS.

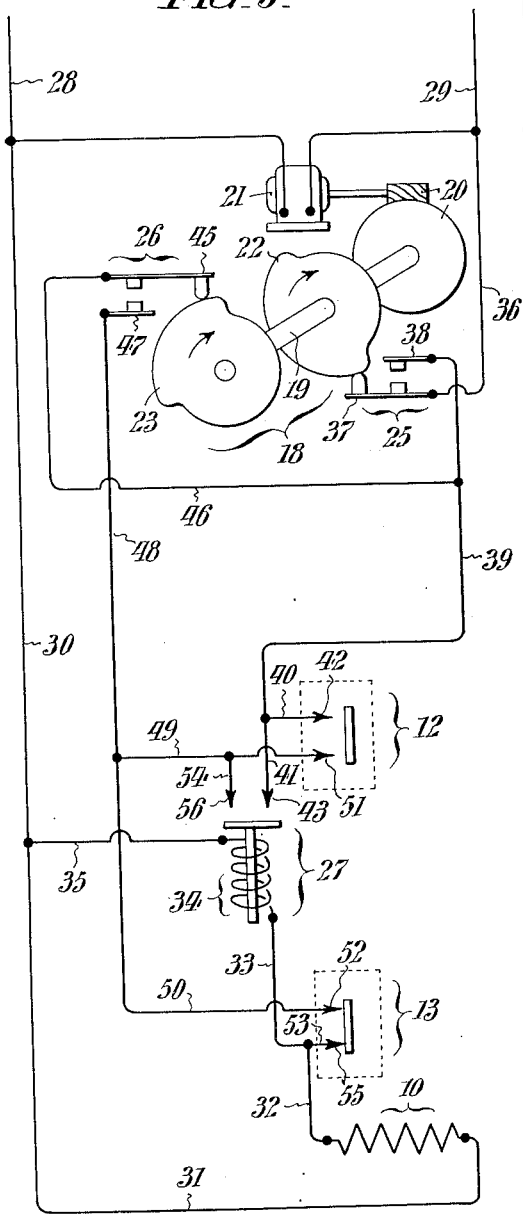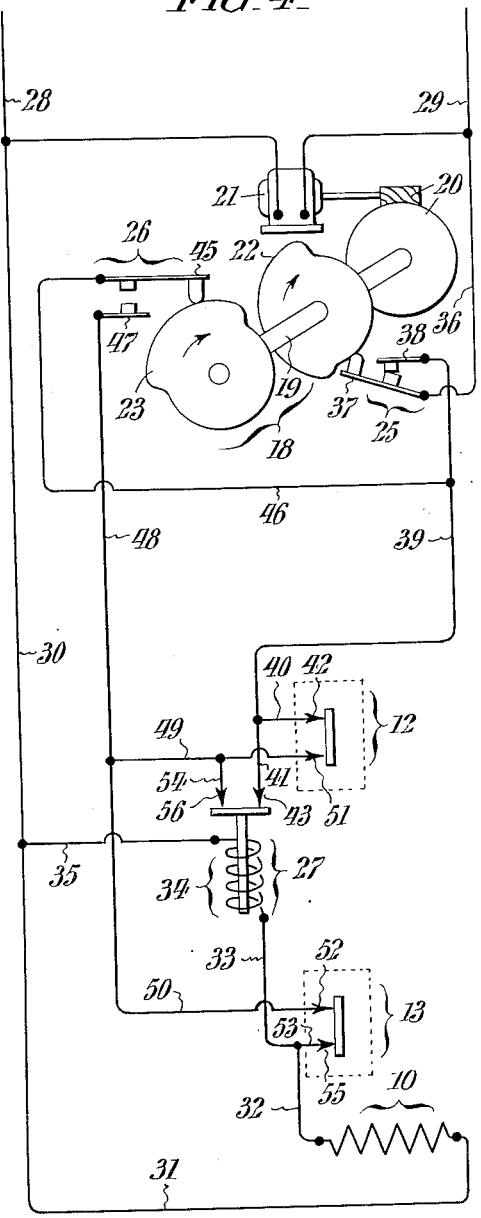

Patented Nov. 24, 1953

2,660,657

UNITED STATES PATENT OFFICE 2,660,657

OFF-PEAK ELECTRIC WATER HEATING SYSTEM

John K. Ostrander, Philadelphia, Pa.

Application May 23, 1952, Serial No. 289,508

1 Claim. (Cl. 219—38)

This invention relates to offpeak water heating systems in which the heating is accomplished electrically.

The chief aim of my invention is to provide a simple and reliable system for automatically controlling the supply of electric power to domestic water heaters so that a desired daily load curve will be obtained for the power line to which the heater is connected, and to make possible thereby, the use of smaller sizes of water tanks for the heaters.

Other objects and attendant advantages will appear from the following detailed description of the attached drawings wherein:

Fig. 1 is a view in axial section of an upright tank of the type ordinarily employed to supply hot water for domestic purposes, with incorporated automatically-controlled electric heating means conveniently embodying my invention.

Fig. 2 is a fragmentary view in horizontal section taken as indicated by the angled arrows II—II in Fig. 1.

Fig. 3 is a wiring diagram of the various instrumentalities of an automatic system by which the heating of the water in the tank is controlled in accordance with my invention, the system being here illustrated in dormant condition.

Fig. 4 is a view like Fig. 3 showing the system in one of its active phases.

The tank illustrated in Figs. 1 and 2 is of standard construction in that it has an upright cylindric metallic shell 5 with a cold water inlet 6 at the bottom and with a hot water outlet 7 at the top. For the purposes of heat conservation, the shell 5 is provided as usual with a jacket 8 of suitable thermal insulation. At 10 in Fig. 1, is indicated the electric resistance coil element for heating the water which, after customary practice, is disposed horizontally adjacent the bottom of the tank.

Rigidly secured, in accordance with my invention, to the side of the shell 5 immediately above heating element 10 and extending approximately up to the mid height of the tank is a relatively thick plate 11 of metal or the like having a high coefficient of thermal conductivity whereon are mounted adjacent the top and bottom, thermostat switches 12 and 13 respectively. As shown, the heating element 10 and the thermostat 12 and 13 are accessible for inspection or for replacement, when necessary, upon removal of a protective door 15 from an opening 16 in the insulation jacket 8. Suitably secured crosswise of the inside of the tank shell 5 in the region of the plate 11 in accordance with my invention, is a vertical diaphragm 17 which, in practice, is fashioned from non-metallic material such as wood or plastic, low in thermal conductivity and which sets apart a narrow upright water channel within the tank shell at that region.

The means which I have devised for automatically controlling heating of the water in the tank includes, as shown in Fig. 3, a timer 18 which may be of the type having a shaft 19 driven, through worm gearing 20, from an electric motor 21 so as to be turned through a single rotation once in every twenty-four hours. Mounted on shaft 19 are rotary cams with rises 22 and 23 for respectively actuating the timer switches designated 25 and 26. As shown, the cams 22 and 23 are so set upon shaft 19 to permit closing of the switches 25 and 26 at different times, the former for example at 10:00 p. m. and the latter at 3:00 a. m. Also included in my improved control is a relay switch 27. Motor 21 is connected directly across the mains 28 and 29 of a power supply line so as to be in continual operation. Extending from power main 28 to one terminal of heating coil 10 are conductors 30 and 31, the other end of said coil being connected through conductors 32 and 33 to one end of the coil 34 of relay 27. The other terminal of relay coil 34 is connected to conductor 30 by a wire 35. A lead 36 extends from main 29 to one contact 37 of timer switch 25, the other contact 38 of said switch being connected through wire 39 and branches 40 and 41 of the latter to the contacts 42 and 43 respectively of thermostat 12 and of relay switch 27. One contact 45 of timer switch 26 is connected by a lead 46 to conductor 39, and the other contact 47 of said switch by a lead 48 and branches 49 and 50 of the latter respectively to the contacts 51 and 52 of the thermostats 12 and 13. Through additional branch wires 53 and 54, the contacts 55 and 56 respectively of thermostat 13 and relay switch 27 are connected to conductors 33 and 49.

*Operation*

If, when the tank is filled with hot water, some of the hot water is withdrawn at the top through outlet 7, a corresponding amount of cold water will enter at the bottom through inlet 6 in the known manner, with establishment of a fairly distinct line of demarcation between the hot and cold stratas or zones at the completion of the draft. During the period, say between 6:00 a. m. and 10:00 p. m. representing the peak hours in the consumption of electricity from the power line, the control system will be in the dormant condition in which it is shown in Fig. 3, i. e., with the switches 25, 26 held open by the cams 22 and 23 of timer 18. Under this condition, no current will be supplied to the heating element 10 notwithstanding closure of both thermostat switches 12 and 13 as hot water is withdrawn from the tank. At 10:00 p. m. switch 25 will close as its contact 37 is cleared by the rise of cam 22 of timer 18. Now, if at this time cold water, say at 50 degrees reaches up to the level A, the upper thermostat 12 will be under the influence of the temperature of the cold water say at 150 degees above level A and will thus be closed as in Fig. 4. On the other hand, if at 10:00 p. m., the cold water reaches up to the level B only, the thermostat 12 will be open, but heat will begin to pass from the water within the upper end of channel C into the upper end of plate 11 and down the plate into the water in the lower end of said channel. Consequently, the temperature of the water in the upper part of channel C will gradually fall even though no more hot water is withdrawn. In this way, heat is transmitted from the upper end of the channel to the lower end. However, as the average temperature of the water in the tank is not changed to any great extent, very little pressure is created in the channel so that very little movement of water will take place. The temperature of the water in the channel finally will become nearly uniform from top to bottom, thereby causing the temperature at the thermostat 12 to be nearly equal to the average temperature of the water on the outside surface of diaphragm 17. Accordingly, the temperature of the thermostat 12 will gradually fall and said thermostat will close as in Fig. 4 even though the cold water level is only at B. The time required for closing will be proportional to the amount of hot water on the outer surface of diaphragm 17 or the amount of hot water in the tank. Upon closing of thermostat 12, which will be assumed to function at 100 degrees, current will flow from main 28, conductors 30 and 31, heating element 10, conductors 32 and 53, closed thermostat 13, conductors 50 and 49, thermostat 12, conductors 40 and 39, switch 25, and conductor 36 to main 29. At the same time, current will pass by way of conductors 35 and 33 through coil 34 of relay 27, thereby closing the latter with attendant shunting of thermostat 12. Under these conditions, the temperature of the cold water in the bottom of the tank will rise until it has reached say 100 degrees, i. e., sufficient to open thermostat 12, and relay 27 will remain closed to hold the circuit through resistance element 10 for continued heating of the water. When the entire contents of the tank is eventually heated, thermostat 13 will open and the system will be thereby restored to dormant condition.

When heating element 10 is energized, the temperature of the body of cold water will rise without much variation in temperature between parts of the cold water section. The temperature of the water in the channel C behind the diaphragm 17 will be approximately equal to the temperature of the water on the other side of the diaphragm. Therefore, the contacts of the upper thermostat 12 will open whenever the temperature of the body of cold water reaches a predetermined value, such as 100 degrees, but as the current is shunted around the contacts of thermostat 12 by relay 27, current will continue to flow until it is interrupted by opening of the contact of thermostat 13 without time delay as a result of the water temperature at the bottom of the tank reaching 150 degrees. Thus, with the described construction there will be a time lag in closing of the contacts of the upper thermostat 12 but no time lag in the opening of said contacts.

At 3:00 a. m., timer switch 26 will close upon advance of the rise of cam 23 beneath the shoe on contact 45 of said switch. If there is any cold water in the tank at this time with the lower thermostat 13 closed, heating element will be energized immediately to begin heating the water as will be readily understood by reference to the diagram of Fig. 4.

Relay switch 27 may have a voltage operating coil as shown in Figs. 3 and 4 or it may have a series coil either of which become energized when current flows through heating element 10. The function of relay switch 27 is to transfer control of the heating element 10 from the upper thermostat 12 to the lower thermostat 13 whenever the contacts of the upper thermostat close, either by establishing a shunt circuit across the contacts of the upper thermostat or by holding contacts of this thermostat closed. As the temperature setting of lower thermostat 13 will be higher than that of upper thermostat 12, the temperature of the water will be determined solely by the lower thermostat. Therefore temperature adjustments of lower thermostat 13 can be made without the necessity of making any changes to upper thermostat 12. Accordingly, the upper thermostat 12 may be of simpler construction than that of lower thermostat 13 because it is never required to interrupt the current.

From the foregoing it will be seen that, with my improved system in operation in connection with multiple heaters, those heaters wherein the cold water reaches the level A will be energized at the early time (10:00 p. m.) when the timer switch 25 closes. Other heaters containing a lesser amount of cold water will be energized between the time that contact 37 of switch 25 closes and the time at which contact 45 of switch 26 closes. Consequently the energizing of many heaters will be delayed for a period of time proportional to the amount of water in the tanks.

Having thus described my invention, I claim:

An automatic off-peak system for controlling the heating of water in a hot water supply tank having a cold water inlet at the bottom, a hot water outlet at the top, and an electric heating element in the bottom, said system including a thermal conductive plate attached to the outer surface of the tank shell and extending partway of the height of the latter from a point immediately above the level of the heating element; a diaphragm constructed of a material low in thermal conductivity and providing a narrow upright water channel within the tank in the region of the said plate; a thermostat switch mounted adjacent the bottom of said plate; a second thermostat switch with a lower temperature setting mounted adjacent the top of said plate at an intermediate level in the tank; a continually operating timer with two switches interposed respectively with the thermostatic switches and the heating element in interlocked circuits; and a relay actuated upon closing of the upper of the two thermostat switches for closing the corresponding timer switch, thereby to establish the circuit controlled by said timer switch and to thereafter hold said circuit closed, notwithstanding opening of said upper thermostat switch, until the lower thermostat switch opens when all of the water in the tank is heated.

JOHN K. OSTRANDER.

References Cited in the file of this patent

UNITED STATES PATENTS

| Number | Name | Date |
|---|---|---|
| 2,266,146 | Biebel | Dec. 16, 1941 |
| 2,266,147 | Biebel | Dec. 16, 1941 |
| 2,576,603 | Hines et al. | Nov. 27, 1951 |